UNITED STATES PATENT OFFICE.

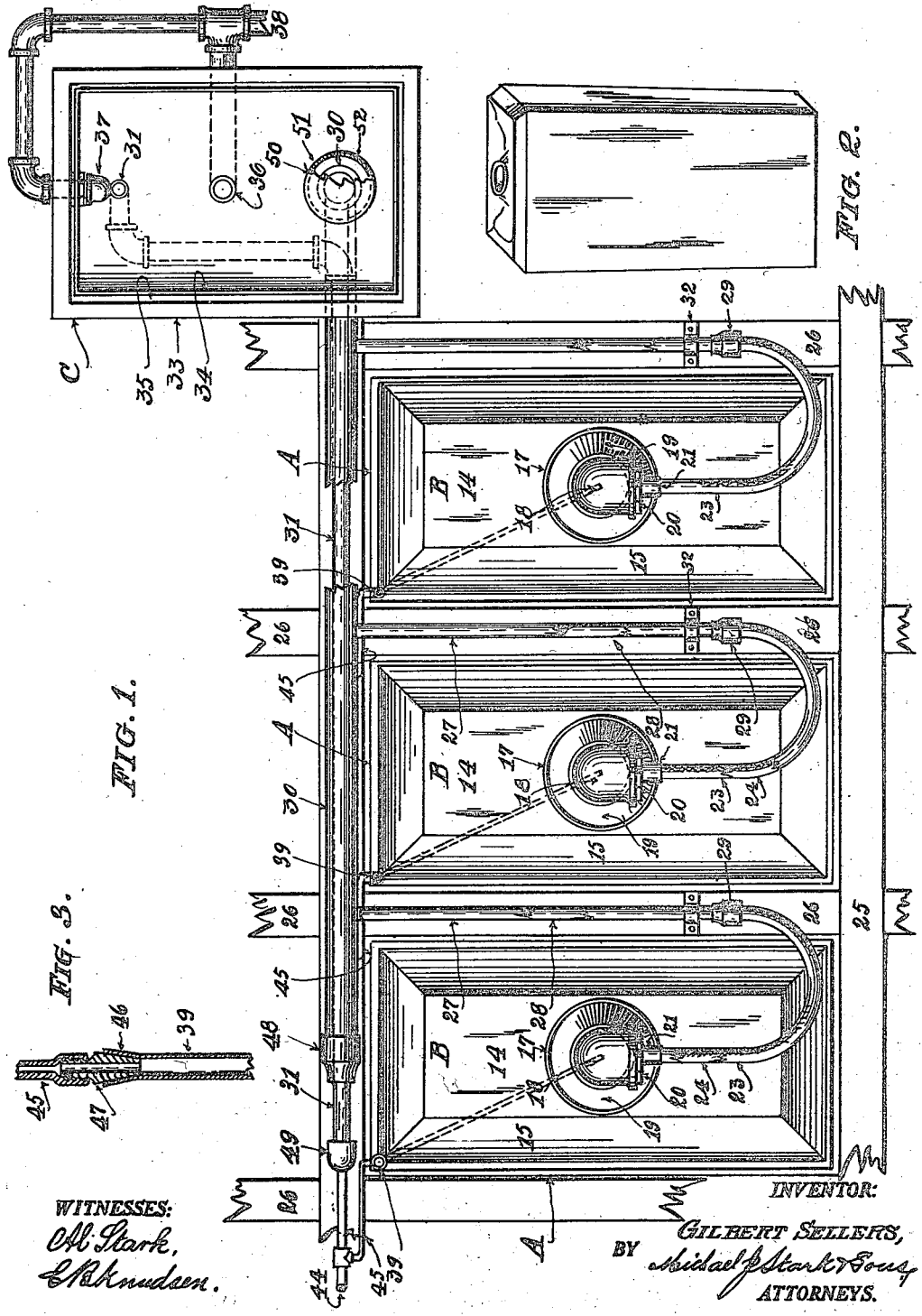

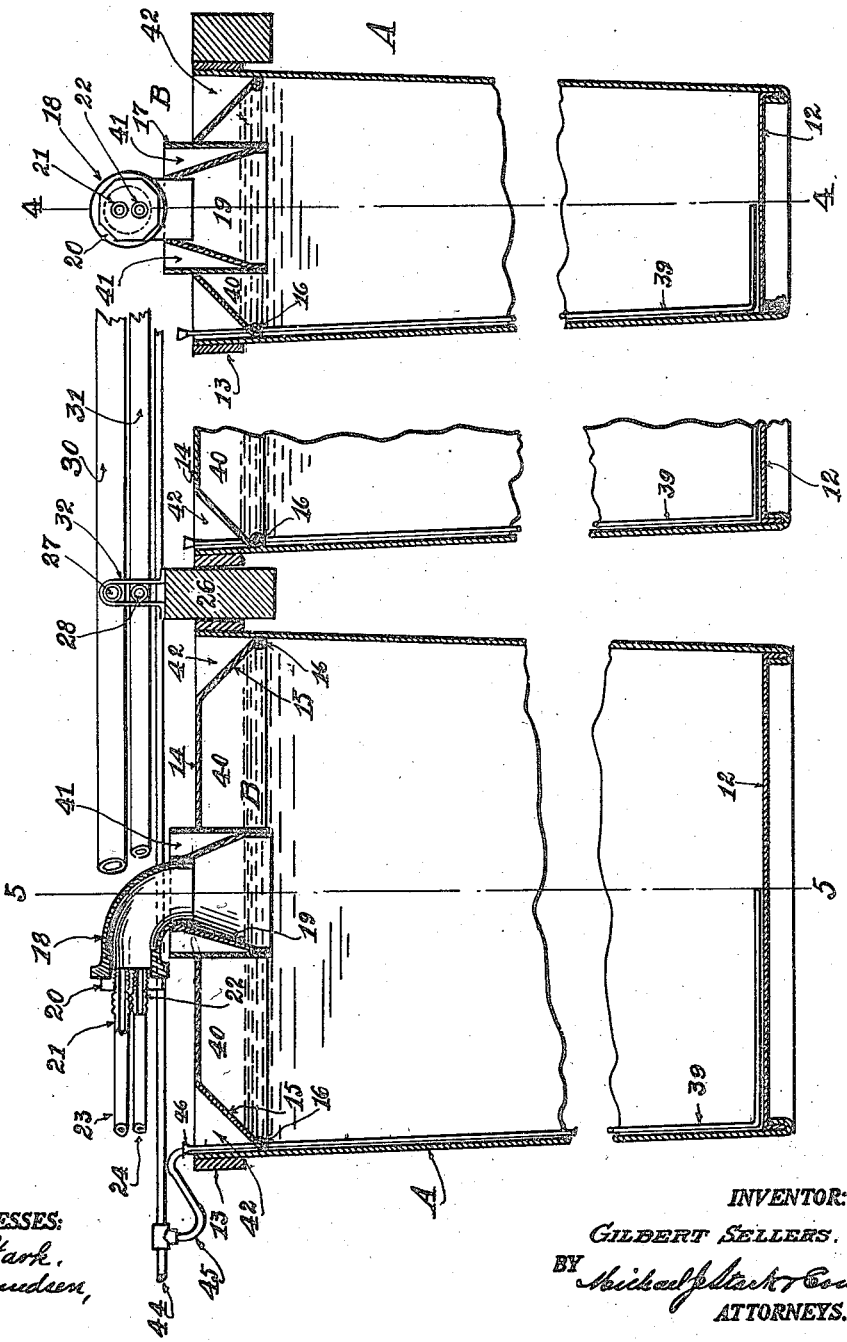

GILBERT SELLERS, OF CHICAGO, ILLINOIS.

APPARATUS FOR MAKING ICE.

1,224,507.  Specification of Letters Patent.  Patented May 1, 1917.

Application filed November 3, 1916. Serial No. 129,366.

*To all whom it may concern:*

Be it known that I, GILBERT SELLERS, a citizen of the United States, and a resident of the city of Chicago, in the county of Cook and State of Illinois, have invented a certain new and useful Improvement in Apparatus for Making Ice; and I do hereby declare that the following description of my said invention, taken in connection with the accompanying sheet of drawing, forms a full, clear, and exact specification, which will enable others skilled in the art to which it appertains to make and use the same.

My invention relates generally to improvements in apparatus for making ice; and it consists, essentially, in the novel and peculiar combination of parts and details of construction, as hereinafter first fully set forth and described and then pointed out in the claims.

It is a well-known fact that in the manufacture of ice from raw water, the impurities contained in the water will separate therefrom as the freezing proceeds, and will, finally, be embedded at the bottom, the central portion, and at the top of the ice-cake, unless these impurities are removed from the forming ice-cake. It has heretofore been the practice to frequently pump the water contained in the space embraced by the already-formed ice, or the core as it is frequently termed, the freezing of which proceeds from the walls of the ice-can toward the center thereof, and to supplant the removed water containing these impurities, with fresh water. This removal of the already considerably chilled water adds to the cost of producing the ice, owing to the loss of the refrigerating agent expended in cooling this water, the loss of the water itself, and the cost of pumping said water out of the ice-can.

It is the object of my present invention to prevent these losses and to produce, from raw water, a perfectly clear cake of ice, free from all impurities, and in every respect fully equal to ice produced from distilled water. To accomplish this object, I construct an ice plant, in the preferred embodiment of my invention, as shown in the drawings already referred to, in which Figure 1 is a plan of a small ice plant constructed in accord with my invention, it being understood that the size of the plant, or the number of ice-cans employed, depends entirely upon the capacity required to supply the demand for ice, and may run to perhaps several thousand of these ice-cans in a single establishment. Fig. 2 is a perspective miniature view of a cake of ice produced in my plant. Fig. 3 is a fragmental sectional view of the air supply pipe line and the connection therewith and the air pipe in the ice-can. Fig. 4 is a longitudinal sectional view of the ice-can and its appurtenants, on line 4—4 of Fig. 5. Fig. 5 is a vertical transverse section on line 5—5 of Fig. 4.

A in these drawings designates an ice-can of usual construction, it being a rectangular vessel, closed below by a bottom 12, open at its top, and there exteriorly reinforced by a metal band 13. This can is slightly tapering, being smallest at the bottom, to facilitate the removal of the ice-cake, as will hereinafter fully appear. Into this ice-can there is placed a cover, B, which cover comprises a plane top member 14, smaller in area than the area of the can, said top member having a skirt 15, depending downwardly and outwardly therefrom, so that the lower margins of the skirt fit the ice-can by a reasonably snug fit, the lower margins of this skirt being reinforced by "wiring" 16, to stiffen the skirt, or is otherwise formed to accomplish the desired result.

Centrally the plane top member 14 has an opening; and in this opening there is secured a round tube 17, extending above the top member 14 for a short distance and downwardly below the same, the lower end of said tube 17 being approximately in line with the lower margin of the skirt 15. Into this tube 17 there is placed a tubular element, preferably an elbow 18, to the lower end of which there is secured a sheet metal cone 19, said cone being thoroughly soldered to said elbow at its upper end, and to the lower terminal of the tube 17 at its lower end. In the outer end of the elbow 18 there is placed a plug 20, which plug has two vertically alined nipples 21, 22, to each of which nipples a flexible, preferably rubber hose 23, 24, is attached.

The ice-cans are usually placed between wooden longitudinal frame-members 25, and similar transverse members 26; and upon each of the latter members there are placed two pipes 27, 28, which pipes have at one of their extremities reducers, 29, the upper one of which connects with the upper hose 23, while the lower one of said reducers connects with the hose 24.

Upon the longitudinal frame members 25 there are located three pipes, 30, 31, and 44, into the upper one of which terminates the upper pipe 27, while in the middle pipe 31 terminates the lower pipe 28, these pipes being secured upon the transverse frame member 26, by pipe cleats 32, or any other efficient means.

The two pipe lines 30, 31, terminate in an expansion tank C, comprising an outer, preferably wooden, box 33, metal-lined internally as at 34, the metal lining 34 being preferably smaller than the interior of the box 33, to separate said lining from the walls of the wooden box, by an air space 35, as clearly indicated in Fig. 1, which space may be filled with any substance which is a poor conductor of heat, such as saw dust, charcoal-dust, and the like.

The upper pipe 30 passes into the expansion tank, preferably near one end thereof, and rises therein a distance of from 4 to 6 inches, while the smaller pipe 31 enters the expansion tank near the other end and rises therein a distance of about 3 inches. In the bottom of the expansion tank there is a waste plug 36; and from near the upper margin of the expansion tank leads an overflow pipe 37, both the waste and the overflow pipes being connected to a soil pipe 38, by suitable connecting pipes, as clearly indicated in Fig. 1.

At one corner of the ice-can A, and passing through the cover B, there is located a very small pipe 39, which pipe reaches to the bottom of the ice-can, as shown in Figs. 4 and 5. This latter pipe 39, connects, in any suitable manner, to an air-compressor, not shown, by a pipe 44, and from this pipe leads a flexible hose 45, to a tapering terminal 47, best shown in Fig. 3. The upper end of this small air pipe 39 is outwardly flared to receive this tapering terminal 47, whereby ready connection and disconnection with the small pipe 39 is assured. This pipe 39, is, as stated, in one corner of the ice-can, and its lower end is bent and carried to the center of the ice-can, as indicated in dotted lines in Fig. 1, said pipe 39 being permanently secured in the ice-can at the latter corner and at its bottom, preferably by soldering.

A battery of ice-cans A, generally ten or twelve, are placed into a brine vat, not shown, which vat is connected to the ice-machines, being an ammonia compressor, etc., all of which are well known elements and need no description or illustration, for a perfect understanding of my invention. Suffice it to state that the brine solution in the vat is kept at a low temperature, (below the freezing point of water) by the gasification of the liquid, compressed ammonia, and that, as soon as the ice-can has been immersed into the brine, and the ice-can filled with water to the lower edge of the skirt 15, the freezing of this water commences, proceeding from the inner walls of the ice-can toward the center thereof, and expanding when passing from the liquid to the solid state, will immediately ice-seal the cover B to the can body at the lower margins of the skirt 15. Dehydrated air is now forced into the ice-can at a pressure of from 20 to 25 pounds to the square inch, by the small pipe 39, which, in a profusion of air bubbles rise to the top of the can, aggitates the water, and passes with the expanding water through the elbow 18, the upper pipes 23, 27, and 30, to the expansion tank C, the cast-off impurities in the water being carried along with the air through these pipes and settle on the bottom of the expansion tank, while the clean water therein returns through the pipes 31, 28, and 24, and the elbow 18 back to the ice-can, there being, therefore, a constant circulation of water from the ice-can to the expansion tank back to the ice-can. The impurities settling in the expansion tank are occasionally removed therefrom by pulling the plug 36.

The expansion tank is covered with a removable cover, not shown, so that the water in the tank retains its low temperature, thereby preventing, to a considerable degree the wasting of the cooling medium employed in the freezing process, while, at the same time, no labor whatsoever is expended in removing the impurities from the water in the ice-can, which is entirely automatically effected.

It will now be observed that owing to the dome-shaped configuration of the cover B, there is formed therein an air-tight chamber or compartment 40, in which air under pressure is entrapped, which air prevents the water in the ice-can from coming in contact with the metallic surfaces of the cover, and prevents, thereby, the freezing of the water thereto. An air space 41, also surrounds the cone 19 and the inner surface of the tube 17; and air-contact with the outer surfaces of the skirt 15, is secured at 42, so that with the exception of the ice-seal at the lower margins of the skirt no ice can form in, and attach itself to, the walls of the cover B, the tube 17, and the cone 19 therein.

When the entire volume of water in the can has been frozen, there remains centrally therein a very small vertical core, through which the air has been passing; and when the ice is to be harvested, the expansion tank is first emptied, warm water is then poured into the space 42, which heats the metal of the skirt sufficiently to cause the ice-seal to be removed by melting the ice thereof, and then the entire cover B may be bodily removed from the ice-can, swung over an adjacent ice-can, the flexible air pipe 45 disconnected, and then the ice-can in question lifted out of the brine vat, carried to a heating vat and immersed therein for a short time to heat the metallic body of the can sufficiently to cause the separation of the ice from the can and the small air pipe therein, when the ice-can will be lifted out of the heating vat and the ice-cake discharged from the can by tilting the latter, which cake of ice is then sent to the ice-storage room, or otherwise disposed of, usually by an early delivery to the consumers.

The pipes 30 and 31 are plugged at their terminals 48 in any desired manner; but I may connect these pipes by a return elbow 49, as shown in Fig. 1. This construction affords additional circulation between the expansion tank through the pipes 30 and 31, thereby insuring perfect and efficient operation of the apparatus, the mixture of water and air being lighter than water, will pass through the upper pipe 30 to the expansion tank, while the heavier, cold water, passes through the medial pipe 31.

Attention is now directed to the fact that in the preferred embodiment of my invention, the expansion tank C is located remote from the ice-cans and that a single expansion tank serves a battery of ice-cans, the result of which is not only the saving of cost of installation, but also of room. And since, when a full battery of ice-cans is connected to said single expansion tank, there is quite an inrush of mixed air and water into said tank, the water therein will be considerably agitated and the settling of the impurities in the tank delayed, if not prevented. To overcome this objection, I place over the inlet to the tank a baffle, 50, which baffle may be a metallic, inverted can or pot, there being near the lower margin of the rim 52, of said pot 50, a series of holes 51. This baffle performs its functions perfectly and removes the objection heretofore stated.

Attention is further directed to the fact that the air admitted to the ice cans is under a pressure of approximately 25 lbs. to the square inch and that this air in passing through the water in the ice can will carry with it to the expansion tank not only the water of expansion, but also additional water, which would finally cause a deficiency of water in the ice can, unless replenished. In my present construction this replenishing is accomplished by placing the expansion tank sufficiently above the top of the ice can so that this surplus water carried to the expansion tank, after having thrown off the impurities contained therein, will return to the ice can through the return pipe, by gravity.

I have heretofore described with considerable minuteness the preferred embodiment of my invention, but I desire it to be understood that minor details may be changed, if desired, without departing from the scope of my invention as ascertained and determined in the subjoined claims.

Having thus fully described this invention, I claim as new, and desire to secure to myself by Letters Patent of the United States—

1. In an apparatus of the nature described, an ice-can, and a removable cover for the same, said cover being adapted for being ice-sealed to said can when ice is forming therein, said cover being dome-shaped, there being in said cover a tube, said tube projecting downwardly through said cover and an element in said tube, said element being secured to the lower end of said tube, whereby air will be entrapped in the upper end of said ice-can when the water in said can reaches said cover, and the ice-sealing attained.

2. In an apparatus of the nature described, an ice-can, and a removable cover for the same, said cover being adapted for being ice-sealed to said can when ice is forming therein, said cover being a dome-shaped structure having a plane top and a downwardly flaring skirt reaching to the inner walls of said ice-can, there being in said cover a central tube, said tube projecting downwardly through said cover, and an element in said tube, the lower end of said element being air tightly secured to the lower end of said tube.

3. In an apparatus of the nature described, an ice-can, and a removable cover for the same, said cover being adapted for being ice-sealed to said can when ice is forming therein, said cover being a dome-shaped structure having a plane top and a downwardly flaring skirt reaching to the inner walls of said ice-can, there being in said cover a centrally located tube, said tube projecting downwardly through said cover, and a metallic cone, the lower end of said cone being air-tightly attached to the lower end of said tube.

4. In an apparatus of the nature described, the combination, of an ice-can, a removable cover for said ice-can, said cover being adapted for being ice-sealed to said can when ice is forming therein, said cover being dome-shaped, there being in said cover a tube, said tube projecting downwardly through said cover, a tubular element in said tube, an expansion tank, and piping connecting said tubular element to said expansion tank.

5. In an apparatus of the nature described, the combination, of an ice-can, a removable cover for said ice-can, said cover being adapted for being ice-sealed to said can when ice is forming therein, said cover being a dome-shaped structure having a plane top and a downwardly flaring skirt reaching to the inner walls of said ice-can, a tube centrally located in said cover, said tube projecting downwardly through said cover, a tubular element in said tube, an expansion tank, and piping connecting said tubular element to said expansion tank.

6. In an apparatus of the nature described, the combination, of an ice-can, a removable cover for said ice-can, said cover being adapted for being ice-sealed to said can when ice is forming therein, said cover being a dome-shaped structure having a plane top and an outwardly flaring skirt reaching to the inner walls of said ice-can, a tube centrally located in said cover, said tube projecting downwardly through said cover, a metallic cone, the lower end of said cone being air-tightly attached to the lower end of said tube, a tubular element in said tube, the upper end of said cone being air-tightly attached to said tubular element, an expansion tank, and piping connecting said tubular element to said expansion tank.

7. In an apparatus of the nature described, the combination, of an ice-can, a cover, removably located near the top of said ice-can, said cover being an inverted pan-shaped, metallic structure, having a plane top and downwardly flaring edges reaching to the inner walls of said ice-can, a tube centrally located in said pan and projecting upwardly therefrom, said pan being adapted for being ice-sealed, an air supply pipe permanently located in said can, a tubular element in said tube, a cone in said tube, said tube being connected to said cone at its lower end, said cone being connected to said tubular element at its upper end.

8. In an apparatus of the nature described, the combination of an ice-can, a cover, said cover being removably located near the top of said ice-can, said cover being an inverted, pan-shaped metallic structure having a plane top and a downwardly and outwardly flaring skirt, a tube centrally located in said plane top and extending upwardly and downwardly therefrom, the lower terminal of said tube being substantially even with the lower margins of said cover-skirt, a tubular element centrally in said tube, a cone in said tube, said cone being attached with its upper end to the lower end of said tubular element, and with its lower end to the lower end of said tube, said tubular element having two, vertically alined branches, an expansion tank, two superposed pipes leading to said expansion tank, and flexible connections between said pipes and the said branches.

9. In an apparatus of the nature described, the combination, of an ice-can, an air-inlet pipe permanently secured at one corner in said ice-can and reaching to the bottom thereof, and being continued to the center of said can, a cover, removably located in said ice-can, said cover being comprised of a plane top and downwardly and outwardly extending flanges, the margins of said flanges reaching to the inner walls of said ice-can, said air pipe passing through one of said flanges at the corner thereof, there being a removable and flexible connection at the upper end of said air pipe, whereby, when ice is forming in said ice-can said cover will be ice-sealed to said can.

10. In an apparatus of the nature described, the combination, of a series of ice-cans, a removable cover for each of said ice cans, said covers becoming ice sealed in said cans when ice is forming therein, and an expansion tank common to the entire series of covers, said expansion tank being connected to said series of covers by a single pipe to conduct the water of expansion with its impurities in suspension, and the air carried in said water, to said expansion tank.

11. In an apparatus of the nature described, the combination, of a series of ice-cans, a removable cover in each of said ice cans, said covers becoming ice sealed in said cans when ice is forming therein, an expansion tank common to the entire series of covers, a pipe connecting all of said covers to said expansion tank, said pipe having an elevated inlet in said expansion tank, and a baffle over the said inlet.

12. In an apparatus of the nature described, the combination, of a series of ice-cans, a removable cover in each of said ice cans, said covers being ice sealed in said cans when ice is forming therein, an expansion tank common to the entire series of covers, a pipe leading from said covers to said expansion tank, to conduct the water of expansion and the impurities contained therein to said expansion tank, a further pipe connecting said expansion tank to said series of covers to return clean water thereto and to establish a circulation of water from said ice-cans to said expansion tank and back from said expansion tank to said ice-cans.

13. In an apparatus of the nature described, a battery of ice-cans, a removable cover in each of said ice cans, said cover being ice sealed in said cans when ice is forming therein, and a single expansion tank common to the entire battery of ice-cans, said expansion tank being located remote from said battery of ice-cans and connected to said covers by a single pipe conducting to said expansion tank the water of expansion, and a further single pipe connecting said expansion tank to said battery of ice-cans to return clean water from said expansion tank to said battery of ice-cans.

In testimony that I claim the foregoing as my invention, I have hereunto set my hand.

GILBERT SELLERS.